(12) United States Patent
Savagaonkar et al.

(10) Patent No.: US 7,802,050 B2
(45) Date of Patent: Sep. 21, 2010

(54) MONITORING A TARGET AGENT EXECUTION PATTERN ON A VT-ENABLED SYSTEM

(75) Inventors: Uday Savagaonkar, Beaverton, OR (US); Ravi Sahita, Beaverton, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 11/541,474

(22) Filed: Sep. 29, 2006

(65) Prior Publication Data
US 2008/0082722 A1      Apr. 3, 2008

(51) Int. Cl.
 *G06F 21/00* (2006.01)
(52) U.S. Cl. ......................................................... 711/6
(58) Field of Classification Search .................. None
 See application file for complete search history.

(56) References Cited

U.S. PATENT DOCUMENTS

| | | | |
|---|---|---|---|
| 4,809,160 | A | 2/1989 | Mahon et al. |
| 5,301,287 | A | 4/1994 | Herrell et al. |
| 5,312,673 | A | 5/1994 | Dressler |
| 5,619,723 | A | 4/1997 | Jones et al. |
| 5,634,043 | A | 5/1997 | Self et al. |
| 5,687,370 | A | 11/1997 | Garst et al. |
| 5,751,989 | A | 5/1998 | Harrison |
| 5,926,549 | A | 7/1999 | Pinkas |
| 5,991,881 | A | 11/1999 | Conklin et al. |
| 6,075,938 | A | 6/2000 | Bugnion et al. |
| 6,105,137 | A | 8/2000 | Graunke et al. |
| 6,125,433 | A * | 9/2000 | Horstmann et al. ......... 711/160 |
| 6,163,834 | A | 12/2000 | Garcia et al. |
| 6,321,276 | B1 | 11/2001 | Forin |
| 6,496,847 | B1 | 12/2002 | Bugnion et al. |
| 6,553,438 | B1 | 4/2003 | Coffman et al. |
| 6,567,897 | B2 | 5/2003 | Lee et al. |
| 6,671,791 | B1 | 12/2003 | McGrath |
| 6,684,305 | B1 | 1/2004 | Deneau |
| 6,732,220 | B2 | 5/2004 | Babaian et al. |
| 6,738,882 | B1 | 5/2004 | Gau |
| 6,751,720 | B2 | 6/2004 | Barroso et al. |

(Continued)

FOREIGN PATENT DOCUMENTS

EP      1 681 630 A1      7/2006

(Continued)

OTHER PUBLICATIONS

U.S. Appl. No. 11/529,828—Non-final OA mailed Feb. 20, 2009.

(Continued)

*Primary Examiner*—Denise Tran
(74) *Attorney, Agent, or Firm*—Schwabe, Williamson & Wyatt, P.C.

(57) ABSTRACT

Methods, apparatuses, articles, and systems for observing, by a virtual machine manager of a physical device, execution of a target process of a virtual machine of the physical device, including virtual addresses of the virtual machine referenced during the execution, are described herein. The virtual machine manager further determines whether the target process is executing in an expected manner based at least in part on the observed virtual address references and expected virtual address references.

29 Claims, 4 Drawing Sheets

U.S. PATENT DOCUMENTS

| | | | |
|---|---|---|---|
| 6,751,737 | B1 | 6/2004 | Russell et al. |
| 6,760,787 | B2 | 7/2004 | Forin |
| 6,804,741 | B2 | 10/2004 | Cowan |
| 6,823,433 | B1 | 11/2004 | Barnes et al. |
| 6,850,994 | B2 | 2/2005 | Gabryjelski |
| 6,883,116 | B2 | 4/2005 | Lee et al. |
| 6,907,600 | B2 * | 6/2005 | Neiger et al. .................. 718/1 |
| 6,920,534 | B2 | 7/2005 | Dover |
| 6,922,766 | B2 | 7/2005 | Scott |
| 6,931,540 | B1 | 8/2005 | Edwards et al. |
| 6,961,852 | B2 | 11/2005 | Craft |
| 6,976,175 | B2 | 12/2005 | England et al. |
| 6,996,551 | B2 | 2/2006 | Hellerstein et al. |
| 7,010,630 | B2 | 3/2006 | Pagan |
| 7,028,229 | B2 | 4/2006 | McGuire et al. |
| 7,058,768 | B2 | 6/2006 | Willman et al. |
| 7,103,779 | B2 | 9/2006 | Kiehtreiber et al. |
| 7,107,497 | B2 | 9/2006 | McGuire et al. |
| 7,111,200 | B2 | 9/2006 | Armstrong et al. |
| 7,225,325 | B2 | 5/2007 | Rhoades |
| 7,260,690 | B2 | 8/2007 | Bruckmlmayr et al. |
| 7,270,193 | B2 | 9/2007 | Hashimoto et al. |
| 7,328,453 | B2 | 2/2008 | Merkle et al. |
| 7,409,472 | B2 | 8/2008 | Iwatani et al. |
| 7,478,394 | B1 | 1/2009 | de Dinechin et al. |
| 7,516,453 | B1 * | 4/2009 | Bugnion .................. 718/1 |
| 7,542,026 | B2 | 6/2009 | Pagan |
| 7,558,966 | B2 | 7/2009 | Durham et al. |
| 7,577,848 | B2 | 8/2009 | Schwartz et al. |
| 7,581,256 | B2 | 8/2009 | Cockerille et al. |
| 7,594,124 | B2 | 9/2009 | Durham et al. |
| 7,603,484 | B2 | 10/2009 | Dai et al. |
| 7,644,287 | B2 | 1/2010 | Oerting et al. |
| 7,650,504 | B2 | 1/2010 | Bodrov |
| 7,653,727 | B2 | 1/2010 | Durham et al. |
| 7,699,242 | B2 | 4/2010 | Mochizuki et al. |
| 2002/0082824 | A1 | 6/2002 | Neiger et al. |
| 2003/0229808 | A1 | 12/2003 | Heintz et al. |
| 2004/0030911 | A1 | 2/2004 | Isozaki et al. |
| 2004/0039924 | A1 | 2/2004 | Baldwin et al. |
| 2004/0064668 | A1 | 4/2004 | Kjos et al. |
| 2004/0226009 | A1 | 11/2004 | Mese et al. |
| 2005/0132122 | A1 | 6/2005 | Rozas |
| 2005/0138417 | A1 | 6/2005 | McNerney et al. |
| 2005/0198051 | A1 | 9/2005 | Marr et al. |
| 2005/0213768 | A1 | 9/2005 | Durham et al. |
| 2005/0289311 | A1 | 12/2005 | Durham et al. |
| 2006/0026387 | A1 | 2/2006 | Dinechin et al. |
| 2006/0026569 | A1 | 2/2006 | Oerting et al. |
| 2006/0156398 | A1 | 7/2006 | Ross et al. |
| 2006/0236125 | A1 | 10/2006 | Sahita et al. |
| 2006/0294596 | A1 | 12/2006 | Govindarajan et al. |
| 2007/0005935 | A1 | 1/2007 | Khosravi et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0156999 | A1 | 7/2007 | Durham et al. |
| 2007/0157003 | A1 | 7/2007 | Durham et al. |
| 2008/0082772 | A1 | 4/2008 | Savagaonkar et al. |
| 2009/0172814 | A1 | 7/2009 | Khosravi et al. |

FOREIGN PATENT DOCUMENTS

| | | |
|---|---|---|
| WO | WO-9847072 | 10/1998 |

OTHER PUBLICATIONS

U.S. Appl. No. 11/529,828—Final OA mailed Jul. 10, 2009.
U.S. Appl. No. 11/529,828—Advisory Action mailed Sep. 11, 2009.
U.S. Appl. No. 11/529,828—Non-final OA mailed Nov. 30, 2009.
U.S. Appl. No. 11/173,851—Non-final OA mailed Apr. 1, 2009.
U.S. Appl. No. 11/173,851—Non-final OA mailed Jan. 21, 2010.
U.S. Appl. No. 11/173,885—Non-final OA mailed Dec. 14, 2009.
U.S. Appl. No. 11/171,859—Non-final OA mailed Jan. 21, 2009.
U.S. Appl. No. 11/171,859—Notice of Allowance mailed Jun. 19, 2009.
U.S. Appl. No. 11/171,859—Notice of Allowance mailed Oct. 6, 2009.
U.S. Appl. No. 11/322,669—Non-final OA mailed Aug. 21, 2009.
U.S. Appl. No. 11/173,142—Non-final OA mailed Jun. 7, 2007.
U.S. Appl. No. 11/173,142—Non-final OA mailed Feb. 13, 2008.
U.S. Appl. No. 11/173,142—Non-final OA mailed Oct. 22, 2008.
U.S. Appl. No. 11/173,142—Final OA mailed Jul. 15, 2009.
U.S. Appl. No. 11/173,813—Non-final OA mailed Jun. 20, 2007.
U.S. Appl. No. 11/428,335—Non-final OA mailed Jun. 26, 2006.
U.S. Appl. No. 11/428,335—Non-final OA mailed Mar. 6, 2008.
U.S. Appl. No. 11/428,335—Non-final OA mailed Oct. 20, 2008.
U.S. Appl. No. 11/428,335—Notice of Allowance mailed Apr. 24, 2009.
U.S. Appl. No. 11/174,315—Non-final OA mailed Feb. 17, 2009.
U.S. Appl. No. 11/174,315—Final OA mailed Sep. 1, 2009.
U.S. Appl. No. 11/173,587—Non-final OA mailed Dec. 5, 2008.
U.S. Appl. No. 11/173,587—Notice of Allowance mailed May 1, 2009.
Duc, G. et al.: "CryptoPage: An Efficient Secure Architecture with Memory Encryption, Integrity and Information Leakage Protection", Computer Security Applications Conference, 2006. ACSAC, 22nd Annual. Dec. 2006, pp. 483-492.
Levy, J. et al.: "Hiding Your Wares: Transparently Retrofitting Memory Confidentiality into Legacy Applications", Communications, 2007. ICC, IEEE International Conference on Jun. 24-28, 2007, pp. 1368-1372.
Yan, Chenyu et al.: "Improving Cost, Performance, and Security of Memory Encryption and Authentication", Computer Architecture, 2006. ISCA, 33rd International Symposium, pp. 179-190.
Windows Platform Design Notes: Standardizing Out-Of-Band Management Console Output and Terminal Emulation (VT-UTF8 and VT100+), Oct. 24, 2001, 15 pages, http://download.microsoft.com/download/1/6/1/161ba512-40e2-4cc9-843a-923143f3456c/StandardinzingOutOfBandManagementConsoleOutput090.doc.
Apple Computer, Inc.: Mac OS C ABI Macho-o File Format Reference, Mar. 8, 2006, 64 pages. (copyright 2003, 2006 Apple, Inc.).
Collins: Intel's System Management Mode, 1999, 8 pages, http://www.rcolling.org/ddj/Jan97/Jan97.html.
Draheim: AMD64/EM64T—The Coming Market, May 4, 2004, 5 pages, http://www2.informatik.hu-berlin.de/~draheim/article/em64t.html.
Grevstad: CPU-Based Security: The NX Bit, Juniperimages, May 24, 2004, 3 pages.
Markatos, et al.: User-Level DMA without Operating System Kernel Modification, Feb. 1-5, 1997, pp. 322-331; High Performance Computer Architecture, 1999, IEEE 3rd International Symposium.
Microsoft Corp.: Microsoft Portable Executable and Common Object File Format Specification, Revision 6.0, Feb. 1999, 77 pages.
Red Hat, Inc.: Red Hat Enterprise Linux 4: Using as, the Gnu Assembler, copyright 2004, 302 pages.
Sheveley: Enhance Virtualization on Intel Architecture-Based Servers, Technology@Intel Magazine, Apr. 2005, pp. 1-9.
The PC Guide: Direct Memory Access (DMA) Modes and Bus Mastering DMA, Apr. 17, 2001; 3 pages; http:www.pcguide.com/ref/hdd/if/ide/modesDMA-c.html.
Tools Interface Standards (TIS): Executable and Linkable Format (ELF), Portable Formats Specification, Version 1.1, 262 pages; TIS Committee, Oct. 1993.
Uhlig, Rich et al.: Intel Virtualization Technology, IEEE Computer Society, May 2005, pp. 48-56.
Webopedia: Bus; Dec. 1, 2002; http://isp.webopedia.com/TERM/B/bus.html.
Webopedia: DMA; Nov. 11, 2003, 2 pages, http://www.webopedia.com/TERM/DMA.html.
Webopedia: Kernel, Mar. 12, 2002, 2 pages, http:www.webopedia.com/TERM/k/kernel.html.

Zhang: Memory Management in JikesNode Operating System, 2005, A thesis submitted to the University of Manchester for the degree of Master of Science in the Faculty of Science and Engineering, pp. 1, 27 and 29.

Chinese Patent Application No. 200710300374.5; Chinese First Office Action issued Mar. 27, 2009, 9 pages.

Chinese Patent Application No. 200710192913.8; Chinese First Office Action issued Jun. 26, 2009, 15 pages.

Korean Patent Application No. 10-2007-98808; KIPO's Notice of Preliminary Rejection issued Apr. 28, 2009, 5 pages.

* cited by examiner

MONITORING A TARGET AGENT EXECUTION PATTERN ON A VT-ENABLED SYSTEM

TECHNICAL FIELD

Embodiments relate to the fields of data processing and information assurance, in particular, to monitoring an execution pattern of a target process to determine if the process is executing in an expected manner.

BACKGROUND

Modern viruses and worms are a significant threat to the security of information processing systems. Host-based intrusion detection systems provide an effective solution to detect worms once they penetrate system defenses. However, numerous worms are able to tamper with and disable intrusion detection systems.

A number of solutions have been offered to this problem, providing methodologies for ensuring that intrusion detection systems are functioning properly. For example, system integrity services are known which require monitored software agents, such as intrusion detection systems, to provide non-spoofable proof of proper functioning. These services, however, require modifications to the programming instructions for the monitored agent. Many software vendors are reluctant to make such modifications. Also, a large number of existing software agents, created prior to the advent of system integrity services, may be unable to provide the non-spoofable proof required for this technology.

Host agent measurement provides a further solution to the problem of worms and viruses disabling intrusion detection systems. Host agent measurement allows a process executing in an independent execution environment to periodically verify that a monitored software agent, such as an intrusion detection system, exists in the host memory in unmodified form. This methodology, however, does not provide any protection against attacks where the virus or worm does not actually modify the monitored agent, but simply disables the agent by tampering with the Operating System scheduler.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for observing, by a virtual machine manager of a physical device, execution of a target process of a virtual machine of the physical device, including virtual addresses of the virtual machine referenced during the execution, are described herein. The virtual machine manager further determines whether the target process is executing in an expected manner based at least in part on the observed virtual address references and expected virtual address references.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1A:
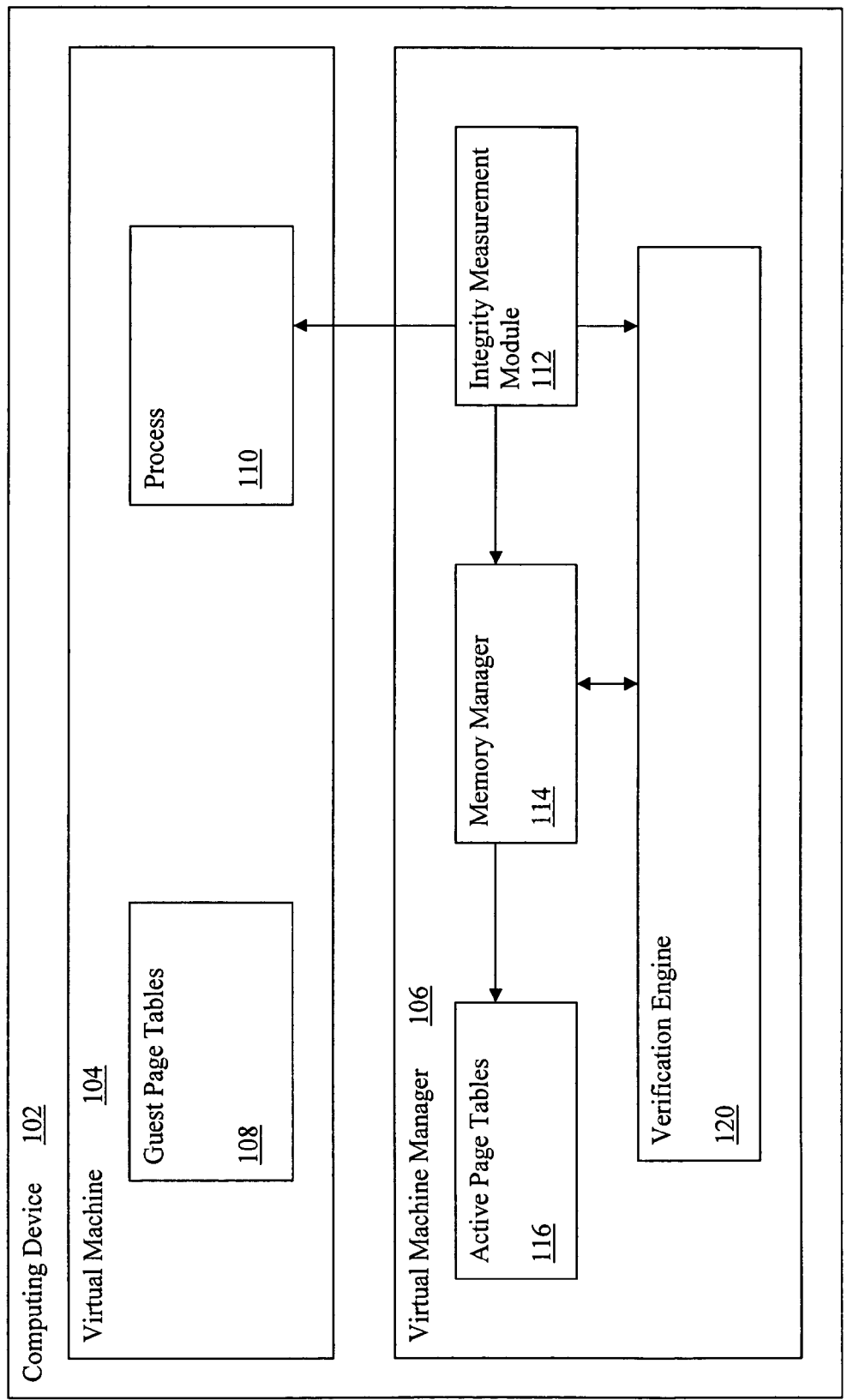
FIGS. 1a-1b illustrate overviews of various embodiments of the present invention, monitoring an execution pattern of a target process to determine if the process is executing in an expected manner.
Figure 1B:
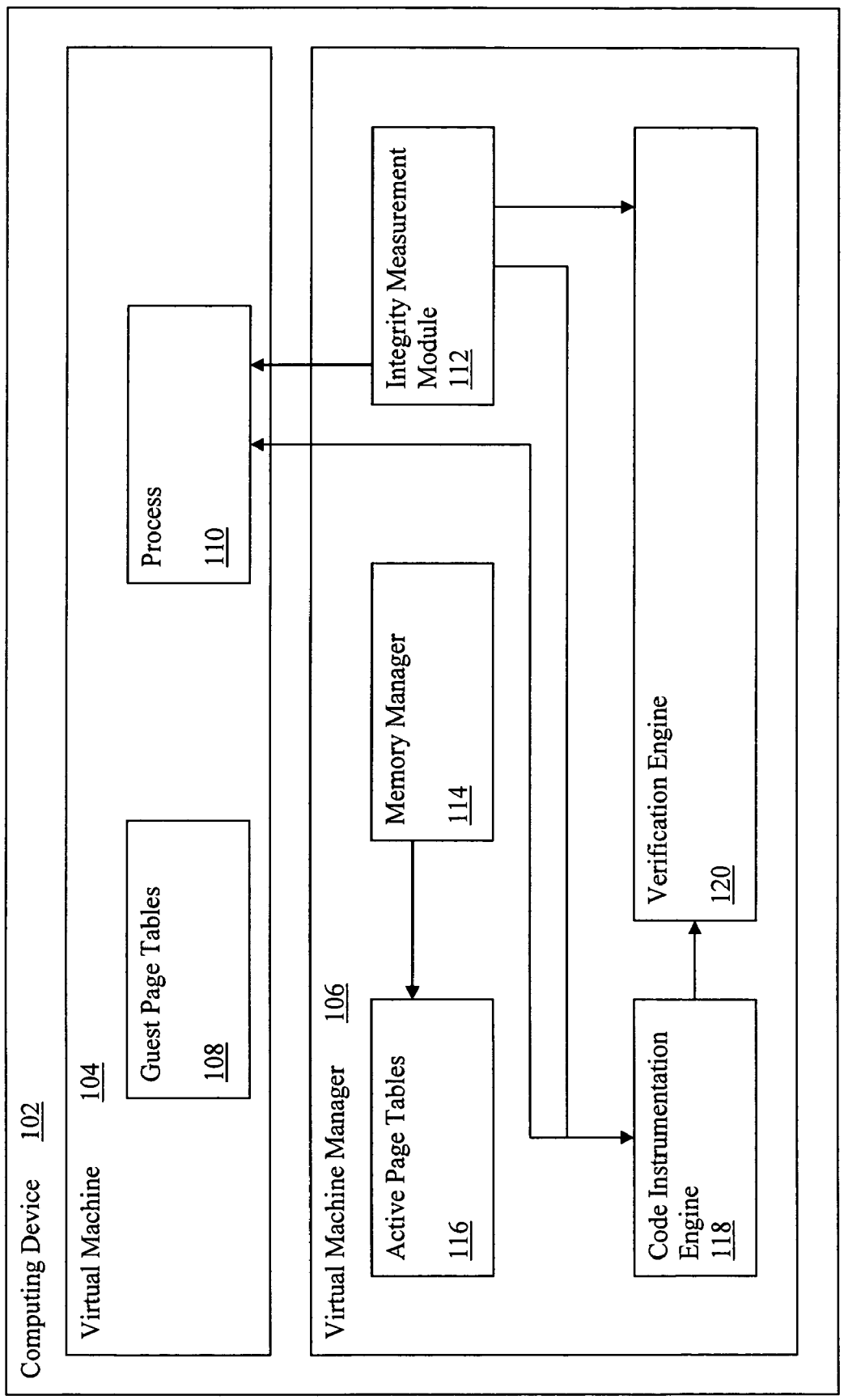

FIGS. 1a-1b illustrate overviews of various embodiments of the present invention, monitoring an execution pattern of a target process to determine if the process is executing in an expected manner. As illustrated, a verification engine 120 of virtual machine manager 106 of computing device 102 (adapted to manage virtual machines of computing device 102) may be further adapted to compare virtual addresses referenced by a target process 110 of a virtual machine 104 of computing device 102 to virtual addresses that the target process 110 is expected to reference. The comparison may involve the generation of statistics by the verification engine 120 and the comparison of the statistics to threshold metrics to facilitate a determination of whether the target process 110 has been compromised. The virtual addresses actually referenced by the target process may be determined by observing the virtual addresses referenced during execution. In one embodiment, illustrated by FIG. 1a, the virtual address references may be observed by modifying active page tables 116 of the virtual machine manager 106 to cause a page fault to the memory manager 114 each time one of the expected virtual addresses is referenced. In an alternate embodiment, illustrated by FIG. 1b, a code instrumentation engine 118 of the virtual machine manager 106 may modify the target process 110 code in memory so that when the target process 110 references one of the expected virtual addresses, the target process 110 may issue a call instruction to the code instrumentation engine 118, which may trap such calls.

In various embodiments, the computing device 102, in addition to virtual machine 104 and virtual machine manager 106, may include other additional virtual machines. Virtual machine 104 may comprise guest page tables 108 storing linear memory address to guest physical address mappings, and a number of processes, such as target process 110. In various embodiments, target process 110 may be a critical process, such as an intrusion detection process. Virtual machine manager 106 may comprise a number of components facilitating management of the virtual machines of computing device 102. Among these components may be an integrity measurement module 112 adapted to verify the integrity of the target process as it is loaded in memory and to provide the memory manager 116 and/or code instrumentation engine 118, as well as the verification engine 120, with an integrity manifest specifying the expected virtual address references. Additionally the virtual machine manager 106 components may further include a memory manager 114, active page tables 116, a verification engine 120, and, in the embodiments illustrated by FIG. 1b, a code instrumentation engine 118.

Figure 3:
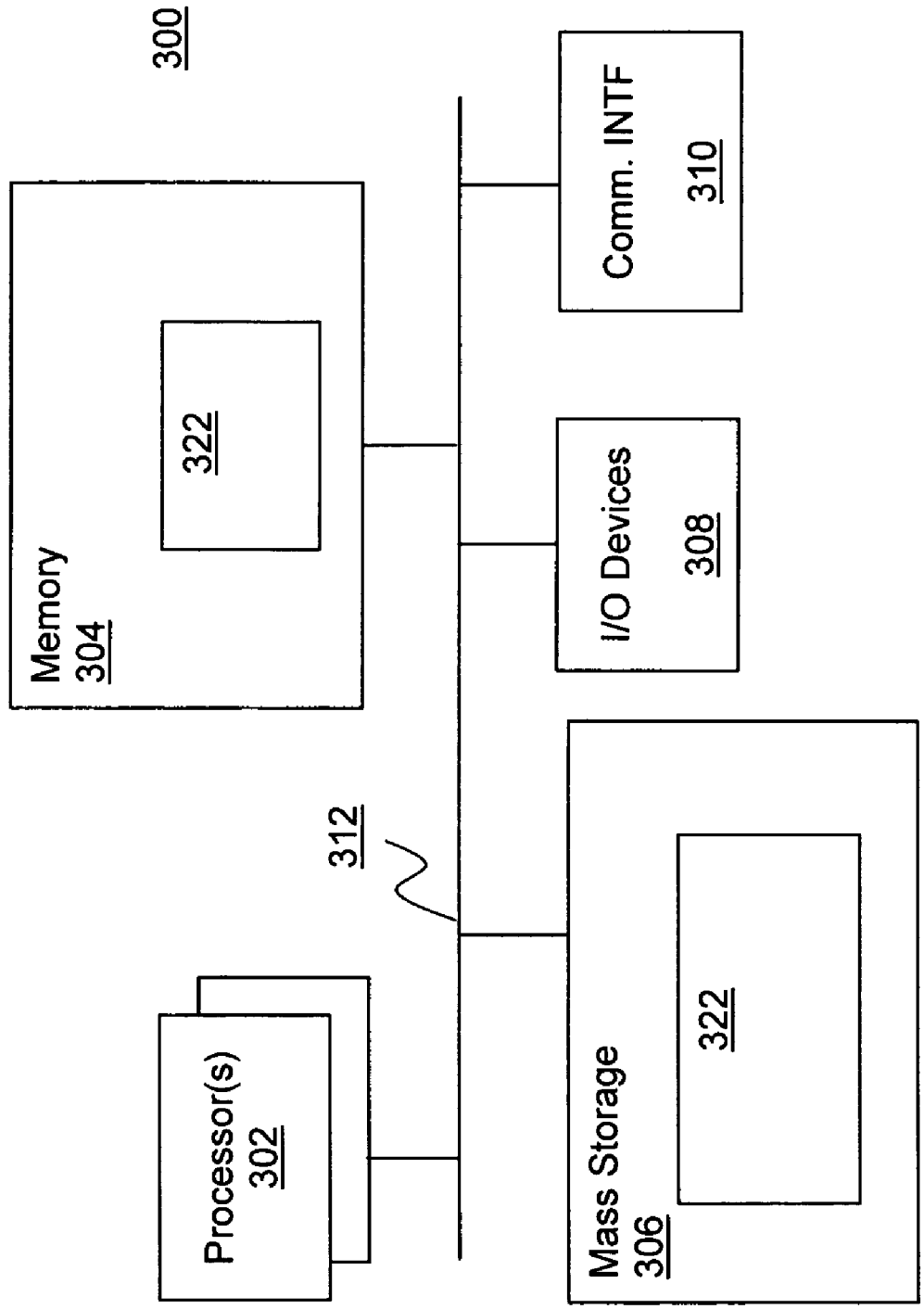
FIG. 3 illustrates an example computer system suitable for use to practice various embodiments of the present invention.

As is shown, computing device 102 may be any single- or multi-processor or processor core central processing unit (CPU) computing system known in the art. Computing device 102 may be a personal computer (PC), a workstation, a server, a router, a mainframe, a modular computer within a blade server or high-density server, a personal digital assistant (PDA), an entertainment center, a set-top box or a mobile device. The computing device 102 may be capable operating a plurality of operating systems of a plurality of virtual machines, such as virtual machine 104, and of a virtual machine manager 106 using virtualization technologies. If computing device 102 is a multi-processor or multi-processor core system, each virtual machine/virtual machine manager of computing device 102 may be coupled to a processor or processor core dedicated to that virtual machine/virtual machine manager. In a single processor or single processor core computing device 102, the plurality of virtual machines and virtual machine manager 106 may share the single processor or processor core. An exemplary single-/multi-processor or processor core computing device 102 is illustrated by FIG. 3, and is described in greater detail below. Hereinafter, including in the claims, processor and processor core shall be used interchangeable, with each term including the other.

As shown and alluded to earlier, computing device 102 may comprise a plurality of virtual machines, such as virtual machine 104. Virtual machine 104, except for the teachings of embodiments of the present invention, may be any sort of virtual machine. Virtual machine 104 may be a self-contained operating environment that behaves as if it is a separate computer system. To an outside system coupled to computing device 102 through a networking fabric, virtual machine 104 may appear to be a separate computing device. Virtual machine 104 may also have an operating system capable of managing multiple processes, such as target process 110, may include data structures for mapping referenced linear memory addresses to guest physical addresses, such as page tables 108, and may have a protected memory space that operationally belongs exclusively to virtual machine 104. Suitable virtual machines and virtualization technologies include but are not limited to those available from Microsoft Corporation of Redmond, Wash., VMware, Inc. of Palo Alto, Calif., and XenSource of Cambridge, UK.

In some embodiments, computing device 102 may comprise a virtual machine manager (hereinafter, VMM) 106, which may have a service operating system (OS) (not shown), an integrity measurement module (IMM) 112, a memory manager 114, active page tables 116, a verification engine 120 and, in some embodiments, such as those illustrated by FIG. 1b, a code instrumentation engine 118. The VMM 106 may comprise a service partition of the computing device 102, managing the actual hardware resources of device 102, including memory pages, such as the memory page of process 110, and coordinating the use of the resources among the virtual machines computing device 102. VMM 106 may be operated by the same processor as virtual machine 104, if computing device 102 is a single-processor device, or may be operated by a different processor of computing device 102 (not shown).

As illustrated, virtual machine 104 may include guest page tables 108. The guest page tables 108 may be used by the processor of virtual machine 104 to lookup the guest physical memory address associated with a linear memory address referenced by an instruction that the processor is executing. The guest page tables 108 may not, however, include mappings between the guest physical address and the host physical address of the memory page that the instruction being processed is attempting to access. As discussed further below, such mappings may be stored in active page tables 116 of the VMM 106. Accordingly, while these guest page tables 108 are created by the virtual machine 104 to facilitate address translation for target process 110, the guest page tables 108 are not used by the virtual machine 104 for full address translation. Guest page tables are well known in the art, and accordingly will not be described further.

In various embodiments, virtual machine 104 may contain a number of processes, such as target process 110. Target process 110 may be a host-based intrusion detection process capable of detecting computer security exploits such as worms and viruses. Exemplary intrusion detection processes include those offered by McAfee of Santa Clara, Calif. and Symantec of Cupertino, Calif. Target process 110 may be loaded in memory of computing device 102 and may reference a number of virtual addresses of its memory space during execution. The virtual addresses may be referenced with a certain frequency and in a certain order during routine execution of target process 110. In some embodiments, such as those illustrated by FIG. 1b, the instructions of target process 110 may be modified in memory by a code instrumentation engine 118 to cause target process 110 to issue VMCALLs to the code instrumentation engine 118 of the VMM 106. After issuing the VMCALLs, the code instrumentation engine 118 may restore the instructions of target process 110 to their original condition. In another embodiment, not shown, rather than referencing virtual addresses for memory accesses, target process 110 may reference virtual addresses of memory-mapped computing device 102 registers. In yet another embodiment, target process 110 may reference a virtual address of another process, executing a call of that process at the virtual address.

As is shown, VMM 106 may include an integrity measurement module (IMM) 112. In some embodiments, IMM 112 is capable of measuring and verifying the integrity of target process 110 as it is loaded in memory. In measuring and verifying the target process 110, IMM 112 may rely on an integrity manifest provided to the IMM by, for example, an administrator. The integrity manifest may describe the target process 110 as it is loaded in memory, may include static information about the target process 110, such as contents of various sections of the target process 110, and may describe a statistical execution profile of the target process 110 capable of identifying the virtual addresses target process 110 is expected to reference, as well as the frequency with which the target process 110 is expected to reference each address. In one embodiment, the statistical execution profile of the integrity manifest may include a histogram representing how frequently the target process 110 should reference given virtual addresses. The IMM 112 may make use of the portion of the integrity manifest describing target process 110 as it is loaded in memory by comparing that description to how the target process 110 is currently loaded in memory, thus verifying that the instructions comprising the target process 110 have not been compromised. Upon verifying the target process 110, IMM 112 may, in one embodiment illustrated in FIG. 1*a*, provide the integrity manifest to memory manager 114 and verification engine 120. In an alternate embodiment, illustrated by FIG. 1*b*, IMM 112 may instead provide the integrity manifest to code instrumentation engine 118 and verification engine 120. Further details on IMM 112 and the integrity manifest may be found in "Signed Manifest for Run-Time Verification of Software Program Identity and Integrity", U.S. patent application Ser. No. 11/173,851, filed on Jun. 30, 2005.

In various embodiments, VMM 106 may include a memory manager 114 adapted to create and maintain active page tables 116 of the VMM 106. In some embodiments, such as those illustrated by FIG. 1*a*, the memory manager 114 of VMM 106 may also be adapted to observe references to virtual addresses that the target process is expected to reference, and to notify verification engine 120 of the references. In one embodiment, memory manager 114 may be further adapted to monitor interdependencies between target process 110 and another process virtually referenced by target process 110, and/or monitor call and return points between target process 110 and the virtually referenced process. The interdependencies and/or call and return points may also be notified to the verification engine 120. Upon receiving verification of the target process 110 from IMM 112 and receiving the integrity manifest, the memory manager 114 may modify the active page tables 116 based on the statistical execution profile of target process 110 described by the integrity manifest. For example, for each virtual address that the target process 110 is expected to reference, the memory manager 114 may mark the corresponding active page table entry for that virtual address as "not present." The processor of virtual machine 104, processing instructions of target process 110 referencing the virtual address marked as not present, may issue a page fault to VMM 106 via a VMEXIT instruction. The memory manager 114 may then note each page fault, and determine if the referenced virtual address associated with the page fault is one of the virtual addresses marked by the memory manager 114 as not present in the active page tables 116. If the page fault is associated with one of those addresses, the memory manager 114 may notify the verification engine 120 of the observed virtual address reference. In one embodiment, the memory manager 114 may only notify the verification engine 120 of the observed virtual address references in a batch at the end of target process 110's execution. In other embodiments, in addition to notifying the verification engine 120 of the virtual addresses referenced, memory manager 114 may also note the type of access associated with each reference (i.e., read access, write access, execute access, access of a computing device 102 register, etc.) and may further notify the verification engine 120 of the types of accesses. In another embodiment, not shown, memory manager may create and maintain nested and extended page tables rather than active page tables 116. Such nested and extended page tables may not be automatically synchronized with the guest page tables 108, but may be executed coherently with the guest page tables 108. In all other aspects, such as the introduction of page faults described above, memory manager 114 may operate on nested and extended page tables in the same manner described above in reference to active page tables 116.

As illustrated, VMM 106 may include active page tables 116 providing guest physical address to host physical address mappings. As described above, the active page tables 116 may be created and maintained by memory manager 114. The active page tables 116 may correspond to the guest page tables 108 and periodically or continually sync up with the guest page tables. Rather than using the guest page tables 108 for address translation, the processor of virtual machine 104 may actually make use of the active page tables 116 to obtain the physical memory location of the memory page the target process 110's instructions are attempting to access. In some embodiments, illustrated by FIG. 1*a*, the memory manager 114 may mark one or more entries of the active page tables 116 as "not present," causing the processor attempting to use the entries to issue a page fault. Active page tables 116 such as active page tables 116 are well known in the art, and accordingly will not be described further.

In some embodiments, such as those illustrated by FIG. 1*b*, VMM 106 may further comprise a code instrumentation engine 118. The code instrumentation engine 118 may be capable of observing virtual addresses referenced by target process 110 and of notifying verification engine 120 of the references. Prior to the execution of the target process 110, code instrumentation engine 118 may modify the instructions of the target process 110 as they are stored in memory to cause the target process 110 to issue VMCALLs to the code instrumentation engine 118 rather than or in addition to referencing a virtual address that the target process 110 is expected to reference. The modifications may be determined based at least in part on the above described integrity manifest which may describe a statistical execution profile of the target process 110, including virtual addresses the target process 110 is expected to reference. For each address, the code instrumentation engine 118 may modify the instruction that would reference the virtual address, replacing it with or adding to it an instruction that, when executed, may make a VMCALL to the code instrumentation engine 118. The code instrumentation engine 118 may then trap the VMCALLs, note a reference of a virtual address for each VMCALL for the virtual address associated with the VMCALL, and notify the verification engine 120 of the reference of the virtual address. In one embodiment, the code instrumentation engine 118 may only notify the verification engine 120 of the observed virtual address references in a batch at the end of target process 110's execution. In other embodiments, in addition to notifying the verification engine 120 of the virtual addresses referenced, code instrumentation engine 118 may also note the type of access associated with each reference (i.e., read access, write access, etc.) and may further notify the verification engine 120 of the types of accesses. Also, in various embodiments, the code instrumentation engine 118 may store a copy of the pre-modified target process 110 instructions and, upon receiving a VMCALL, perform run-time patching of the target process 110, restoring it to its pre-modification state and emulating un-modified execution of the target process 110. Code instrumentation engine 118 may then reinsert the modification into the target process 110 memory, allowing for further references to result in further VMCALLs.

As is shown in both FIGS. 1*a* and 1*b*, VMM 106 may also comprise a verification engine 120 adapted to compare the observed virtual address references to the expected virtual address references, generate statistics based upon the comparison, and compare at least one of the generated statistics to a threshold metric. As described above, the verification engine 120 may receive notification of the observed virtual address references from either memory manager 114 (in the series of embodiments illustrated by FIG. 1*a*) or code instrumentation engine 118 (in the series of embodiments illustrated by FIG. 1*b*). In one embodiment, verification engine 120 may also be notified of the types of accesses of at least some of the observed virtual address references. As is also described above, verification engine 120 may also receive the integrity manifest from IMM 112 describing the statistical execution profile of target process 110, including virtual addresses target process 110 is expected to reference and also a frequency with which target process 110 is expected to reference one or more of the virtual addresses. In one embodiment, the integrity manifest may also provide threshold metrics.

Upon receiving the observed virtual address references and the integrity manifest, verification engine 120 may compare the observed references to the expected references and generate a statistical measure, such as a percentage, to describe the observed execution. In some embodiments, verification engine 120 may also determine an observed frequency or frequencies describing how often one or more virtual addresses were referenced, may compare the computed observed frequency to an expected frequency, and may generate a statistical measure, such as a standard deviation to describe the magnitude of variation from the expected frequency.

In some embodiments, the integrity manifest may also include an expected type of access, and verification engine 120 may compare the observed access type to an expected access type, and may generate statistical measures, such as those described above, based on the comparison. In one embodiment, the integrity manifest may also include expected interdependencies and/or call and return points, such as those mentioned above, and verification engine 120 may compare the observed interdependencies and/or call and return points to expected interdependencies and/or call and return points, and may generate statistical measures, such as those described above, based on the comparison.

After generating the statistical measures, verification engine 120 may compare the measures to threshold metrics. Threshold metrics may represent, for instance, a value which the measure must meet. If the comparison results in the conclusion that the measure does not meet the threshold metric, the verification engine 120 may, for example, notify an administrator of computing device 102 via an alert or any other suitable mechanism known in the art.

Figure 2:
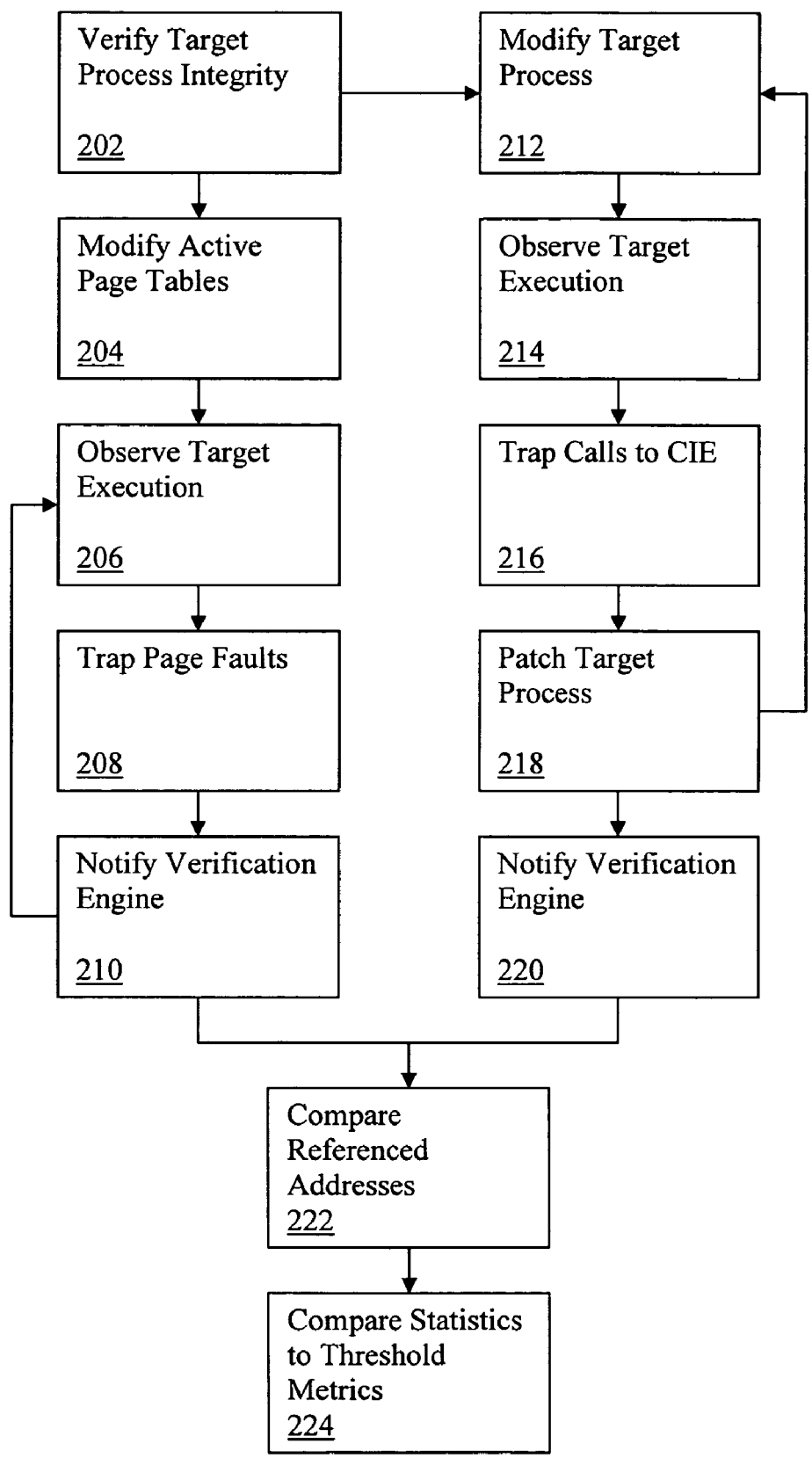
FIG. 2 illustrates a flow chart view of selected operations of the methods of various embodiments of the present invention.

FIG. 2 illustrates a flow chart view of selected operations of the methods of various embodiments of the present invention. As illustrated, an IMM of a VMM of a computing device may verify the integrity of a target process of a virtual machine of the computing device as it is loaded in memory, block 202. In verifying the integrity of the target process, the IMM may make use of an integrity manifest describing the process as it is loaded in memory, as well as describing a statistical execution profile of the target process, including virtual addresses that the target process is expected to reference and frequencies with which the target process is expected to reference virtual addresses.

In some embodiments, illustrated by FIG. 1*a* and described above, the IMM, after verifying the target process, may provide the integrity manifest to a memory manager and a verification engine of the VMM. The memory manager may then modify the active page tables of the VMM, block 204, marking as "not present" virtual addresses listed by the integrity manifest as expected to be referenced. The memory manager may next observe the execution of the target process, block 206, by trapping/noting page faults, block 208, issued by the processor of the virtual machine processing the instructions of the target process. The processor may issue faults upon attempting to translate the referenced virtual address using the active page tables, since the active page tables have been modified by the memory manager to mark the virtual address as "not present." After trapping/noting a page fault, the memory manager may note the observation of a virtual address reference and may notify the verification engine of the observed reference, block 210.

In alternate embodiments, illustrated by FIG. 1*b* and described above, the IMM, after verifying the target process, may provide the integrity manifest to a code instrumentation engine and the verification engine of the VMM. The code instrumentation engine may then note the virtual addresses that the target process is expected to reference, and may modify the instructions comprising the target process in memory, block 212, to cause the target process to issue VMCALLs to the code instrumentation engine upon reaching an instruction to reference one of the expected virtual addresses. The code instrumentation engine may also store the target process instructions in unmodified form prior to modifying the target process. After modifying the target process, the code instrumentation engine may observe the execution of the target process, block 214, trapping/receiving VMCALLs made by the target process in response to the modifications, block 216. Upon receiving each VMCALL, the code instrumentation engine may perform run-time patching of the target process, block 218, restoring the instructions to their pre-modified state, thus emulating unmodified execution of the target process. After trapping a VMCALL, the code instrumentation engine may observe a reference to the virtual address associated with the VMCALL, and may notify the verification engine of the observation of a virtual address reference, block 220.

Upon receiving the notifications of virtual address reference observations from either the memory manager or the code instrumentation engine, the verification engine may compare the observed references to expected virtual address references obtained from the integrity manifest, block 222, and may generate one or more statistical measures, such as a percentage, to summarize the observed execution. In one embodiment, the verification engine may also determine one or more frequencies with which the observed virtual addresses were referenced, may compare that frequency or frequencies to expected frequencies obtained from the integrity manifest, and may generate one or more statistical measures, such as a standard deviation. After generating the statistical measures, the verification engine may compare the statistical measures to threshold metrics, block 224, to determine whether an administrator of the computing device needs to be alerted.

FIG. 3 illustrates an example computer system suitable for use to practice various embodiments of the present invention. As shown, computing system 300 includes a number of processors or processor cores 302, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CDROM) and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown). In various embodiments, mass storage devices 306 may be divided into multiple partitions for use by the virtual machines, with each virtual machine having exclusive use of the assigned partition.

Each of these elements performs its conventional functions known in the art. In particular, system memory 304 and mass storage 306 may be employed to store a working copy and a permanent copy of the programming instructions implementing all or selected aspect of the memory manager, integrity measurement module, code instrumentation engine, verification engine, and so forth, herein collectively denoted as 322. The instructions may be compiled from assembler instructions supported by processor(s) 302 or high level languages, such as C.

The permanent copy of the programming instructions may be placed into permanent storage 306 in the factory, or in the field, through, for example, a distribution medium (not shown), such as a compact disc (CD), or through communication interface 310 (from a distribution server (not shown)).

The constitution of these elements 302-312 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
   receiving, by a virtual machine manager of a physical device, an integrity manifest of a target process of a virtual machine of the physical device, the integrity manifest describing a statistical execution profile of the target process identifying virtual addresses the target process is expected to reference;
   observing, by the virtual machine manager, execution of the target process of the virtual machine, including virtual addresses of the virtual machine referenced by the target process during the execution;
   comparing, by the virtual machine manager, the observed virtual address references with the expected virtual address references identified by the integrity manifest;
   determining, by the virtual machine manager, whether the target process is compromised based at least in part on said comparing; and
   issuing, by the virtual machine manager, an alert in response to a determination that the target process is compromised.

2. The method of claim 1, wherein the observing is performed by a memory manager of the virtual machine manager, and the method further comprises modifying by the memory manager active page tables of the virtual machine manager, so that said references to virtual addresses are trapped for processing by the memory manager.

3. The method of claim 2, wherein said modifying, by the memory manager, comprises modifying the active page tables of the virtual machine manager so that said references to virtual addresses cause page faults to the memory manager.

4. The method of claim 1, wherein the observing is performed by a memory manager of the virtual machine manager, and the method further comprises modifying by the memory manager nested and extended page tables of the virtual machine manager, so that said references to virtual addresses are trapped for processing by the memory manager.

5. The method of claim 1, wherein the observing is performed by a code instrumentation engine of the virtual memory manager, and the method further comprises modifying the target process, by the code instrumentation engine, so that said references to the virtual addresses are trapped for processing by the code instrumentation engine.

6. The method of claim 5, wherein the modification comprises modifying the target process to call the code instrumentation engine when the virtual addresses are to be referenced, and the method further comprises
   first, on trapping of a reference, restoring, by the code instrumentation engine, replaced instructions of the target process to enable an original function to be executed,
   second, on trapping of a reference, notifying, by the code instrumentation engine, a verification engine of the trapping, the verification engine noting the reference to the virtual address, and
   third, on execution, re-modifying, by the code instrumentation engine, the instruction to enable future reference to the virtual address to be trapped to the code instrumentation engine again.

7. The method of claim 1, wherein the virtual addresses are memory mapped to a computing device register.

8. The method of claim 1, further comprising additionally observing a type of memory access for at least one of the observed virtual address references.

9. The method of claim 1, wherein the target process is an intrusion detection process for protecting the physical device from intrusions of viruses or worms.

10. The method of claim 1, wherein said observing further comprises monitoring at least one of interdependencies and call and return points of the target process and another process virtually referenced by the target process.

11. The method of claim 1, further comprising comparing, by the virtual machine manager, the target process as described in the integrity manifest with the target process loaded in memory.

12. The method of claim 1, wherein the integrity manifest further describes frequencies with which the target process is expected to reference the identified virtual addresses.

13. The method of claim 1, wherein the integrity manifest may include a histogram representing how frequently the target process is expected to reference the identified virtual addresses.

14. A method comprising:
   receiving, by a virtual machine manager of a physical device, an integrity manifest of a target process of a virtual machine of the physical device, the integrity manifest describing a statistical execution profile of the target process identifying virtual address the target process is expected to reference;
   observing, by the virtual machine manager, execution of the target process of the virtual machine, including virtual addresses of the virtual machine referenced during the execution;
   comparing, by a verification engine, reference statistics of various virtual addresses to corresponding threshold metrics;
   determining, by the virtual machine manager, whether the target process is compromised based at least in part on the observed virtual address references and expected virtual address references; and
   issuing, by the virtual machine manager, an alert in response to a determination that the target process is compromised.

15. A physical device comprising:
   one or more processors; and
   a virtual machine manager operated by the one or more processors and adapted to receive an integrity manifest of a target process describing a statistical execution profile of the target process identifying virtual addresses the target process is expected to reference, observe execution of the target process of a virtual machine of the physical device, including observation of virtual addresses of the virtual machine referenced during the execution, determine whether the target process is compromised based at least in part on the observed virtual address references and expected virtual address references, and to issue an alert in response to a determination that the target process is compromised, the virtual machine manager including a memory manager adapted to perform said observing, including modification of active page tables so that references to virtual addresses are trapped for processing by the memory manager; and wherein the virtual machine manager further comprises a verification engine adapted to perform said determining by comparing the observed virtual address references with the expected virtual address references and to generate reference statistics based on the comparison.

16. The physical device of claim 15, wherein the virtual machine and the virtual machine manager are operated by the same processor.

17. The physical device of claim 15, wherein said memory manager is adapted to modify the active page tables of the virtual machine manger so that said references to virtual addresses cause page faults to the memory manager.

18. The physical device of claim 15, wherein the virtual machine manager further includes an integrity management module adapted to verify the integrity of the target process using the integrity manifest, wherein the integrity manifest further describes the target process as it is loaded in memory of the physical device.

19. The physical device of claim 15, wherein the verification engine is further adapted to compare the reference statistics of various virtual addresses to corresponding threshold metrics.

20. The physical device of claim 15, wherein the target process is an intrusion detection process.

21. An article of manufacture comprising:
a non-transitory tangible computer-readable storage medium; and
a plurality of programming instructions stored thereon designed to program a physical device to provide a virtual machine manager including a code instrumentation engine to the physical device, to enable the physical device to
receive, by the virtual machine manager, an integrity manifest of a target process of a virtual machine of the physical device, the integrity manifest describing a statistical execution profile of the target process identifying virtual addresses the target process is expected to reference,
modify, using the code instrumentation engine, the target process of the virtual machine of the physical device, so that said references to virtual addresses of the virtual machine are trapped for processing by the code instrumentation engine,
observe, using the code instrumentation engine of the virtual machine manager of the physical device, execution of the target process, including virtual addresses of the virtual machine referenced during the execution,
compare, by the virtual machine manager, the observed virtual address references with the expected virtual address references,
determine, by the virtual machine manager, whether the target process is compromised based at least in part on the observed virtual address references and expected virtual address references, and
issue, by the virtual machine manager, an alert in response to a determination that the target process is compromised.

22. The article of claim 21, wherein the plurality of programming instructions are further designed to provide the virtual machine manager with a verification engine, enabling the physical device to further perform the determining by the verification engine comparing reference statistics of various virtual addresses to corresponding threshold metrics.

23. An article of manufacture comprising:
a non-transitory computer-readable storage medium; and
a plurality of programming instructions stored thereon designed to program a physical device to provide a virtual machine manager including a code instrumentation engine to the physical device, to enable the physical device to
modify, using the code instrumentation engine, a target process of a virtual machine of the physical device, so that said references to virtual addresses of the virtual machine are trapped for processing by the code instrumentation engine,
observe, using the code instrumentation engine of the virtual machine manager of the physical device, execution of the target process, including virtual addresses of the virtual machine referenced during the execution, and
determine, by the virtual machine manager, whether the target process is executing in an expected manner based at least in part on the observed virtual address references and expected virtual address references; and
modify the target process, using the code instrumentation engine, so the target process calls the code instrumentation engine when the virtual addresses are to be referenced, and
restore the target process on trapping of a reference, using the code instrumentation engine, replacing instructions of the target process to enable an original function to be executed, and to re-modify the process on execution, to enable future reference to the virtual address to be trapped to the code instrumentation engine again.

24. The article of claim 23, wherein the programming instructions are further adapted to provide the virtual machine manager with a verification engine, and to provide the code instrumentation engine adapted to notify the verification engine, on trapping of a reference, with the verification engine noting the reference to the virtual address.

25. The article of claim 23, wherein the target process is an intrusion detection process.

26. A system comprising:
one or more processors;
volatile memory coupled to the one or more processors, and capable of storing observed virtual addresses referenced during execution of a target process of a virtual machine of the system and expected virtual address references for comparison; and
a mass storage coupled to the one or more processors, and having stored therein instructions implementing a virtual machine manager operated by one of the one or more processors and adapted to
receive, by the virtual machine manager, an integrity manifest of the target process describing a statistical execution profile of the target process identifying virtual addresses the target process is expected to reference;

observe, by the virtual machine manager, the execution of the target process, including the virtual addresses referenced during the execution;

compare, by a verification engine, the observed virtual addresss references with the expected virtual address references;

generate, by the virtual machine manager, reference statistics based on the comparison;

determine, by the virtual machine manager, whether the target process is compromised based at least in part on the observed virtual address references and expected virtual address references; and issue, by the virtual machine manager, an alert in response to a determination that the target process is compromised.

27. The system of claim 26, wherein the virtual machine manager further comprises a memory manager adapted to perform said observing and to modify active page tables of the virtual machine manger so that said references to virtual addresses cause page faults to the memory manager.

28. The system of claim 26, wherein the virtual machine manager further comprises an integrity management module, the integrity measurement module adapted to verify the integrity of the target process using the integrity manifest, wherein the integrity manifest further describes the target process as it is loaded in the mass storage.

29. The system of claim 26, wherein the target process is an intrusion detection process.

\* \* \* \* \*